United States Patent
Dostes et al.

(10) Patent No.: US 10,800,549 B2
(45) Date of Patent: Oct. 13, 2020

(54) METHOD FOR ASSEMBLING A PRIMARY STRUCTURE OF AN AIRCRAFT PYLON

(71) Applicants: Airbus Operations S.A.S., Toulouse (FR); AIRBUS OPERATIONS LTD, Bristol (GB)

(72) Inventors: Stéphane Dostes, Montaigut sur Save (FR); Thierry Theron, Colomiers (FR); Audrey Benaben, Toulouse (FR); Thomas Deforet, Toulouse (FR); Julien Moulis, Le Castera (FR); Joel Dedieu, Saint Jean de Verges (FR); Robert Whiffen, Whitby Ellesmere Port (GB); François Martinel, Colomiers (FR)

(73) Assignees: Airbus Operations S.A.S. (FR); AIRBUS OPERATIONS LTD (GB)

( * ) Notice: Subject to any disclaimer, the term of this patent is extended or adjusted under 35 U.S.C. 154(b) by 11 days.

(21) Appl. No.: 16/149,210

(22) Filed: Oct. 2, 2018

(65) Prior Publication Data
US 2019/0112074 A1    Apr. 18, 2019

(30) Foreign Application Priority Data

Oct. 18, 2017  (FR) ..................... 17 59784
Feb. 23, 2018  (FR) ..................... 18 51599

(51) Int. Cl.
*B64D 27/26* (2006.01)
*B64F 5/00* (2017.01)

(52) U.S. Cl.
CPC ............. *B64F 5/00* (2013.01); *B64D 27/26* (2013.01); *B64D 2027/264* (2013.01)

(58) Field of Classification Search
CPC ...... B64F 5/00; B64D 27/26; B64D 2027/264
See application file for complete search history.

(56) References Cited

U.S. PATENT DOCUMENTS

| | | | |
|---|---|---|---|
| 7,931,232 B2 * | 4/2011 | Bernardi | B64D 27/18 244/54 |
| 2010/0090056 A1 | 4/2010 | Gardes et al. | |
| 2011/0011972 A1 * | 1/2011 | Vache | B64D 27/26 244/54 |
| 2011/0204179 A1 | 8/2011 | Skelly et al. | |
| 2015/0013142 A1 * | 1/2015 | West | B64D 27/26 29/525.08 |
| 2015/0251768 A1 | 9/2015 | Woolley et al. | |

FOREIGN PATENT DOCUMENTS

| | | |
|---|---|---|
| FR | 2 915 178 A1 | 10/2008 |
| WO | 2010018323 A1 | 2/2010 |

* cited by examiner

*Primary Examiner* — David P Bryant
*Assistant Examiner* — Lawrence Averick
(74) *Attorney, Agent, or Firm* — Lerner, David, Littenberg, Krumholz & Mentlik, LLP

(57) ABSTRACT

A method for assembling a primary structure of an aircraft pylon, includes a step of fixing an angle bracket to each of the first and second lateral panels such as to obtain an L form for each of the first and second lateral panels prior to a placement of said L forms each placed against two sides of each transverse frame. This assembly technique makes it possible to reduce the mounting clearances such that it is unnecessary to fit shims, resulting in a reduction of mounting time and manufacturing costs.

7 Claims, 3 Drawing Sheets

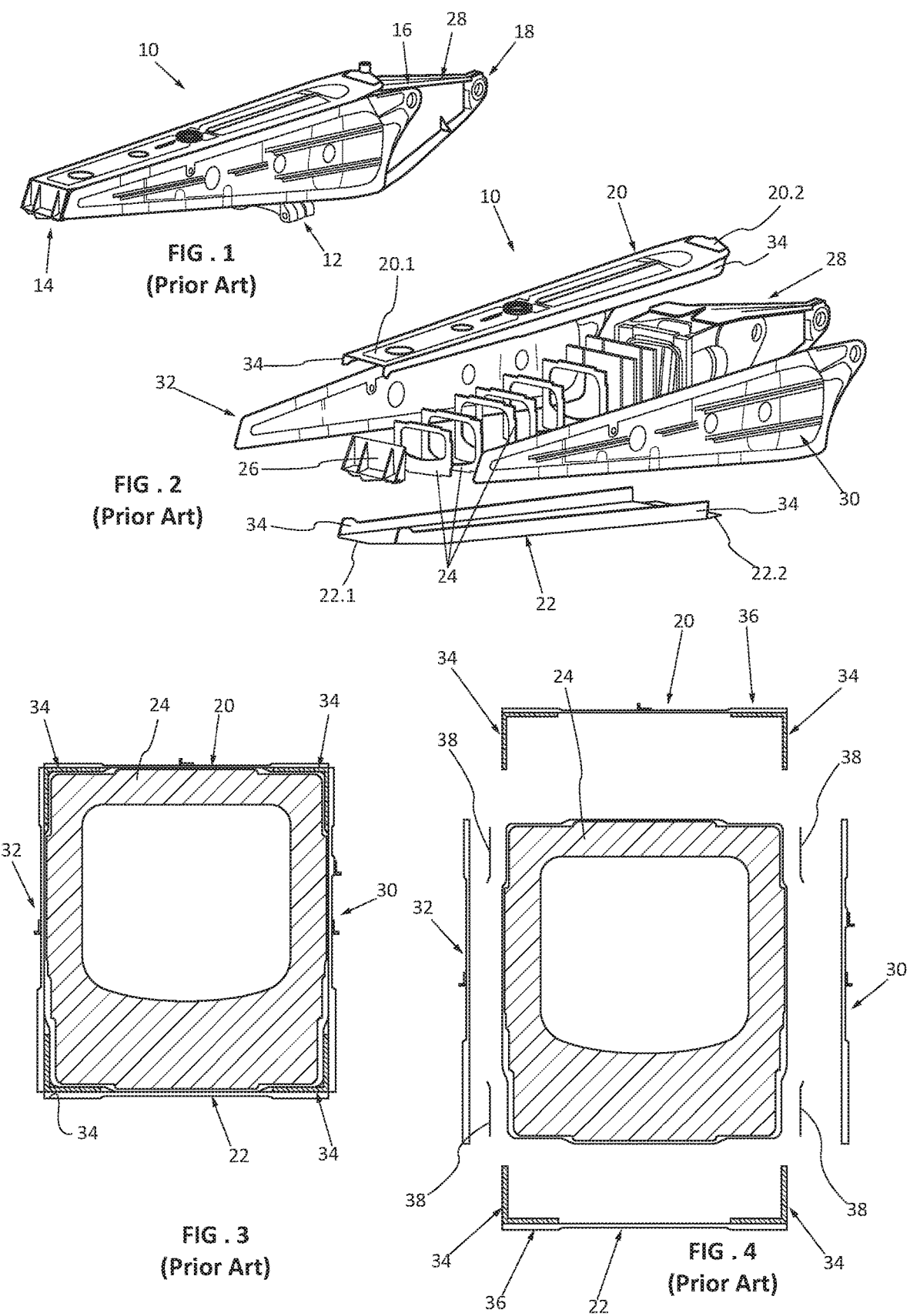

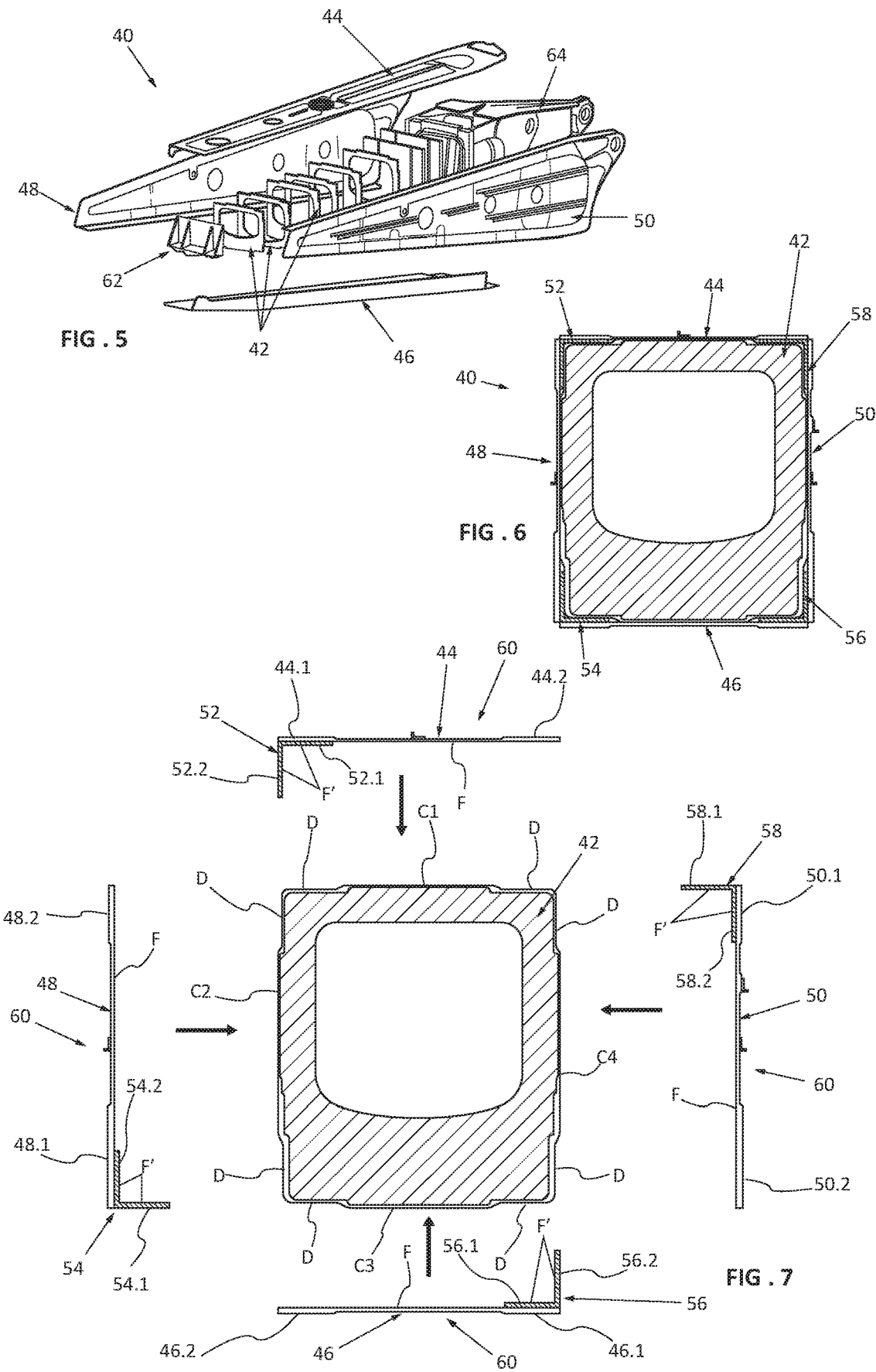

METHOD FOR ASSEMBLING A PRIMARY STRUCTURE OF AN AIRCRAFT PYLON

FIELD OF THE INVENTION

The present application relates to a method for assembling a primary structure of an aircraft pylon and also to a primary structure of an aircraft pylon thus obtained.

BACKGROUND OF THE INVENTION

An aircraft comprises, for connecting each engine to the wing, a pylon that has a rigid primary structure that, inter alia, transmits forces between the engine and the wing, and a secondary structure that encloses the primary structure and limits pylon drag.

According to a configuration that could be seen in FIGS. 1 and 2, the primary structure 10 is connected, on the one hand, to the engine by means of a rear engine mount 12, a front engine mount 14 and a pair of push rods that ensure the take-up of the thrust forces and, on the other, to the wing by means of at least one front wing mount 16 and a rear wing mount 18.

The primary structure 10 comprises:
an upper longitudinal member 20,
a lower longitudinal member 22,
transverse frames 24 that connect the upper and lower longitudinal members 20, 22, which are arranged in transverse planes and each have an approximately square or rectangular contour,
a front end wall 26 that connects a front end 20.1 of the upper longitudinal member 20 and a front end 22.1 of the lower longitudinal member 22,
a rear end part 28 that connects a rear end 20.2 of the upper longitudinal member 20 and a rear end 22.2 of the lower longitudinal member 22,
two lateral panels 30, 32 arranged on either side of the transverse frames 24 and also four angle brackets 34 connecting each longitudinal member 20, 22 to each lateral panel 30, 32.

According to one assembly method, in a first step the angle brackets 34 are fixed to the edges of the upper and lower longitudinal members 20, 22. Thus, each upper or lower longitudinal member 20, 22, equipped with two angle brackets 34, has a U form 36, as illustrated in FIG. 4.

In a second step, the transverse frames 24 are inserted between the branches of the U forms 36 of the upper and lower longitudinal members 20, 22 equipped with the angle brackets 34. The same applies to the front end wall 26 and to the rear end wall 28.

By virtue of the U forms 36 and manufacturing tolerances, mounting clearances are necessary between the transverse frames 24 and the branches of the U forms 36 of the upper and lower longitudinal members 20, 22 equipped with the angle brackets 34.

In order to take up forces during operation, these mounting clearances have to be filled. As a result, these mounting clearances are measured and peelable shims 38 adjusted as a function of the measured clearances are placed in the mounting clearances.

Next, the lateral panels 30, 32 are put in place. The various components are temporarily fixed at a small number of points. They are then drilled and definitive fastenings are put in place.

Measurement of the mounting clearances, adjustment of the shims and their placement requires a great deal of time. Moreover, in order to reduce the mounting clearances, the manufacturing tolerances of the longitudinal members 20, 22 and of the transverse frames 24 are very small, resulting in a high manufacturing cost.

BRIEF SUMMARY OF THE INVENTION

Aspect of the present invention may remedy the prior-art drawbacks.

An aspect of the invention is a method for assembling a primary structure of an aircraft pylon, which comprises:
transverse frames each with an approximately square or rectangular contour comprising four sides,
first and second longitudinal members positioned above and below the transverse frames,
first and second lateral panels arranged on either side of the transverse frames,
four angle brackets connecting each longitudinal member to each lateral panel, accommodated in recesses provided on the transverse frames.

According to an aspect of the invention, the assembly method comprises a step of fixing an angle bracket on each of the first and second lateral panels such as to obtain an L form for each of the first and second lateral panels prior to a placement of said L forms each placed against two sides of each transverse frame.

This assembly method makes it possible to eliminate at least fifty percent of the mounting clearances. This absence of clearances makes it possible to dispense with the steps of measurement of the clearances, adjustment of peelable shims as a function of the measured mounting clearances and placement of peelable shims, resulting in a reduction of the time for assembling the primary structure. Moreover, the various components of the primary structure can be manufactured with fewer dimensional tolerances, which tends to reduce manufacturing costs.

According to a first aspect, the assembly method comprises a step of fixing an angle bracket on each of the first and second longitudinal members such as to obtain an L form for each of the first and second longitudinal members prior to a placement of said L forms each placed against two sides of each transverse frame.

According to this first aspect, a first wing of a first angle bracket is connected to a first longitudinal edge of the first longitudinal member, a second wing of a second angle bracket is connected to a first longitudinal edge of the first lateral panel, a first wing of a third angle bracket is connected to a first longitudinal edge of the second longitudinal member and a second wing of a fourth angle bracket is connected to a first longitudinal edge of the second lateral panel.

According to this first aspect, the assembly method comprises the following steps of:
positioning the first longitudinal member placed against a first side of the transverse frames and of a second wing of the first angle bracket placed against a second side of the transverse frames,
positioning of the first lateral panel placed against the second side of the transverse frames and of a first wing of the second angle bracket placed against a third side of the transverse frames, said first lateral panel covering the second wing of the first angle bracket,
positioning of the second longitudinal member placed against the third side of the transverse frames and of a second wing of the third angle bracket placed against a fourth side of the transverse frames, said second longitudinal member covering the first wing of the second angle bracket, positioning of the second lateral panel placed against the fourth side of the transverse frames and of a first wing of the fourth angle bracket placed against the first side of the transverse frames, by inserting the first wing of the fourth angle bracket between the first side of the transverse frames and the first longitudinal member, the second lateral panel covering the second wing of the third angle bracket.

According to a second aspect, the assembly method comprises a step of fixing two angle brackets to one of the first and second longitudinal members such as to obtain a U form prior to a placement of the first and second longitudinal members placed against the sides of each transverse frame.

According to this second aspect, the assembly method comprises the following steps of:
 positioning of the longitudinal member, provided with the two angle brackets, placed against one of the sides of the transverse frames, wings of the two angle brackets being arranged on either side of the transverse frames,
 positioning of the first and second lateral panels placed against two opposite sides of the transverse frames, and
 positioning of the longitudinal member that is not provided with an angle bracket placed against one of the sides of the transverse frames.

According to a further aspect, the assembly method comprises a step of placement of:
 first fixings, perpendicular to a vertical median plane, traversing one of the first and second lateral panels, a wing of one of the two angle brackets integral with the first or second longitudinal member and at least partially the transverse frames,
 second fixings, perpendicular to the vertical median plane, traversing the other of the first and second lateral panels, a wing of the other angle bracket integral with the first or second longitudinal member and at least partially the transverse frames,
 third fixings, parallel to the vertical median plane, traversing the longitudinal member that is not provided with an angle bracket, a wing of an angle bracket integral with one of the first and second lateral panels and at least partially the transverse frames,
 fourth fixings, parallel to the vertical median plane, traversing the longitudinal member that is not provided with an angle bracket, a wing of a angle bracket integral with the other of the first and second lateral panels and at least partially the transverse frames.

The invention also relates to a primary structure of an aircraft pylon obtained using the assembly method defined above.

BRIEF DESCRIPTION OF THE DRAWINGS

Other features and advantages will become apparent from the following description of the invention given solely by way of example with reference to the appended drawings, in which:

FIG. 1 is a perspective view of a primary structure of an aircraft pylon,

FIG. 2 is an expanded view of a primary structure of an aircraft pylon illustrating one embodiment of the prior art, FIG. 3 is a transverse section of the primary structure that can be seen in FIG. 2, FIG. 4 is an expanded transverse section of the primary structure that can be seen in FIG. 2, FIG. 5 is an expanded view of a primary structure of an aircraft pylon illustrating a first embodiment of the invention, FIG. 6 is a transverse section of the primary structure that can be seen in FIG. 5, FIG. 7 is an expanded transverse section of the primary structure that can be seen in FIG. 5.

DETAILED DESCRIPTION

Figure 8:
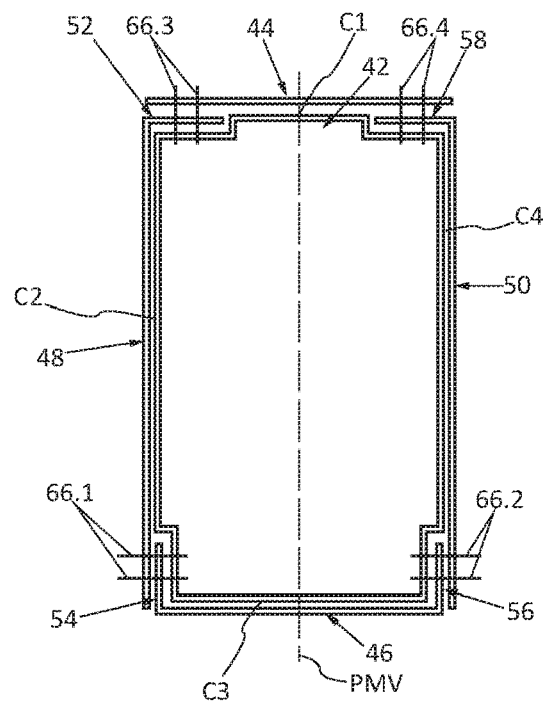
FIG. 8 is a transverse section of a primary structure of an aircraft pylon illustrating a second embodiment of the invention.

According to the various embodiments that can be seen in FIGS. 5 to 9, a primary structure 40 comprises transverse frames 42, each with an approximately square or rectangular contour, first and second longitudinal members 44, 46 positioned above and below the transverse frames 42, first and second lateral panels 48, 50 arranged on either side of the transverse frames 42, four angle brackets 52 to 58 connecting each longitudinal member 44, 46 to each lateral panel 48, 50.

The transverse frames 42, the longitudinal members 44, 46, the lateral panels 48, 50 and the angle brackets 52 to 58 are not described further as they may be identical to those of the prior art. Furthermore, the primary structure 40 may comprise other elements such as, for example, a front end wall and a rear end part.

Each transverse frame 42 comprises four sides c1 to c4 that each have recesses D for receiving the angle brackets 52 to 58.

According to one embodiment, the longitudinal members 44, 46 and the panels 48, 50 are in the form of plates each having a face F oriented towards the transverse frames 42 when the primary structure 40 is assembled.

The first longitudinal member 44 comprises a first longitudinal edge 44.1 that is juxtaposed with the first lateral panel 48 and a second longitudinal edge 44.2 that is juxtaposed with the second lateral panel 50.

The first lateral panel 48 comprises a first longitudinal edge 48.1 that is juxtaposed with the second longitudinal member 46 and a second longitudinal edge 48.2 that is juxtaposed with the first longitudinal member 44.

The second longitudinal member 46 comprises a first longitudinal edge 46.1 that is juxtaposed with the second lateral panel 50 and a second longitudinal edge 46.2 that is juxtaposed with the first lateral panel 48.

The second lateral panel 50 comprises a first longitudinal edge 50.1 that is juxtaposed with the first longitudinal member 44 and a second longitudinal edge 50.2 that is juxtaposed with the second longitudinal member 46.

Each angle bracket 52 to 58 comprises a first wing 52.1 to 58.1, configured in order to interact with one of the longitudinal members 44, 46, and a second wing 52.2 to 58.2, configured in order to interact with one of the lateral panels 48, 50. Each wing 52.1 to 58.1 and 52.2 to 58.2 has a face F' oriented towards the transverse frames 42 when the primary structure 40 is assembled. The recesses D of the transverse frames 42 are configured to accommodate the wings 52.1 to 58.1 and 52.2 to 58.2 of the angle brackets 52 to 58 such that the longitudinal members 44, 46, the panels 48, 50 and the angle brackets 52 to 58 are simultaneously in contact with the sides c1 to c4 of the transverse frames 42.

According to a first embodiment of the invention that can be seen in FIGS. 5 to 7, the assembly method comprises a step of fixing a angle bracket on each of the longitudinal members 44, 46 and each of the lateral panels 48, 50 such as to obtain an L form 60.

Thus, the first wing 52.1 of the first angle bracket 52 is connected to the first longitudinal edge 44.1 of the first longitudinal member 44, the second wing 54.2 of the second angle bracket 54 is connected to the first longitudinal edge 48.1 of the first lateral panel 48, the first wing 56.1 of the third angle bracket 56 is connected to the first longitudinal edge 46.1 of the second longitudinal member 46 and the second wing 58.2 of the fourth angle bracket 58 is connected to the first longitudinal edge 50.1 of the second lateral panel 50.

In a second step, each L form 60 is placed against two sides of each transverse frame 42.

Thus, the faces F and F' of the longitudinal members 44, 46, lateral panels 48, 50 and angle brackets 52 to 58 are placed against the transverse frames 42 without there remaining any clearance requiring shims.

According to one operating method, the assembly method comprises the following steps of:

- positioning the first longitudinal member 44 placed against the first side c1 of the transverse frames 42 and of the second wing 52.2 of the first angle bracket 52 placed against the second side c2 of the transverse frames 42;
- positioning of the first lateral panel 48 placed against the second side c2 of the transverse frames 42, said first lateral panel 48 covering the second wing 52.2 of the first angle bracket 52 and of the first wing 54.1 of the second angle bracket 54 placed against the third side c3 of the transverse frames 42;
- positioning of the second longitudinal member 46 placed against the third side c3 of the transverse frames 42, said second longitudinal member 46 covering the first wing 54.1 of the second angle bracket 54 and of the second wing 56.2 of the third angle bracket 56 placed against the fourth side c4 of the transverse frames 42;
- positioning of the second lateral panel 50 placed against the fourth side c4 of the transverse frames 42, said second lateral panel 50 covering the second wing 56.2 of the third angle bracket 56 and of the first wing 58.1 of the fourth angle bracket 58 placed against the first side c1 of the transverse frames 42, by inserting it between the first side c1 of the transverse frames 42 and the first longitudinal member 44.

The primary structure 40 may comprise other elements such as, for example, a front end wall 62 and a rear end part 64 against which the L forms 60 are placed.

Figure 9:
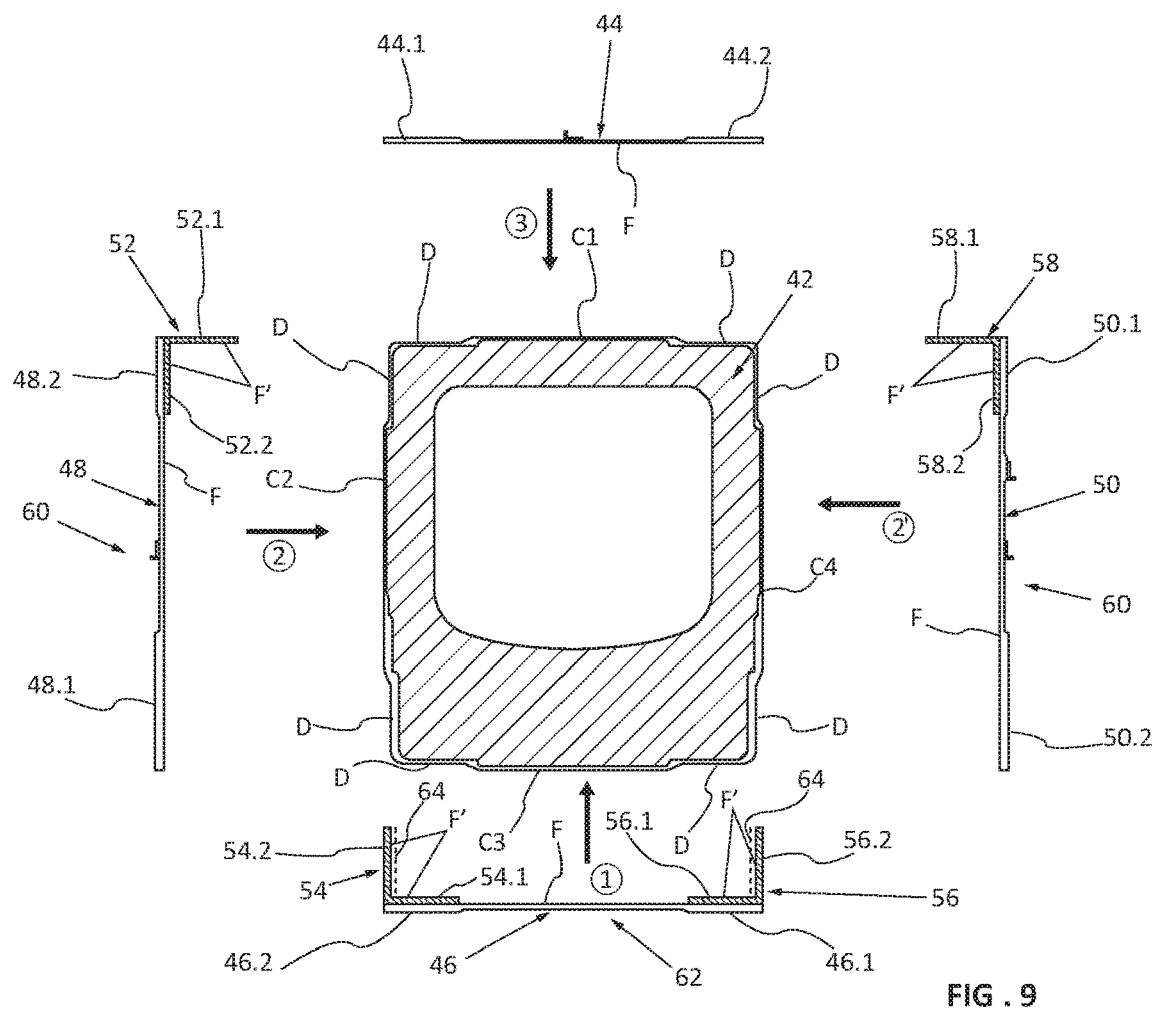
FIG. 9 is an expanded transverse section of the primary structure that can be seen in FIG. 8.

According to a second embodiment that can be seen in FIGS. 8 and 9, the assembly method comprises a step of fixing a angle bracket on each of the lateral panels 48, 50 such as to obtain an L form 60 and two angle brackets on one of the first and second longitudinal members such as to obtain a U form 62. According to the example illustrated in FIGS. 8 and 9, two angle brackets 54 and 56 are fixed on the second longitudinal member 46, positioned under the transverse frames 42, such as to obtain the U form 62.

According to this second embodiment, in a first step, the second wing 52.2 of the first angle bracket 52 is connected to the second longitudinal edge 48.2 of the first lateral panel 48, the first wings 54.1, 56.1 of the second and third angle brackets 54, 56 are connected to the first and second longitudinal edges 46.1 and 46.2 of the second longitudinal member 46 and the second wing 58.2 of the fourth angle bracket 58 is connected to the first longitudinal edge 50.1 of the second lateral panel 50.

In a second step, if necessary, a shim 64 is positioned between at least one of the second wings 54.2 and 56.2 of the second and third angle brackets 54 and 56 integral with the second longitudinal member 46 and at least one of the transverse frames 42 and the second longitudinal member 46 (more particularly the face F thereof) is positioned placed against the second side c2 of the transverse frames 42, the second wings 54.2, 56.2 of the second and third angle brackets 54 and 56 being arranged on either side of the transverse frames 42.

In a third step, the first and second lateral panels 48 and 50 are positioned placed against the second and fourth sides c2 and c4 of the transverse frames 42.

In a fourth step, the first longitudinal member 44 is placed against the first side c1 of the transverse frames 42.

To complete assembly, first and second fixings 66.1, 66.2 are put in place at the second wings 54.2 and 56.2 of the second and third angle brackets 54 and 56, perpendicularly relative to a vertical median plane PMV (parallel to the lateral panels 48 and 50). The first fixings 66.1 traverse the first lateral panel 48, the second wing 54.2 of the second angle bracket 54 integral with the second longitudinal member 46 and at least partially the transverse frames 42. The second fixings 66.2 traverse the second lateral panel 50, the second wing 56.2 of the third angle bracket 56 integral with the second longitudinal member 46 and at least partially the transverse frames 42.

Third and fourth fixings 66.3, 66.4 are put in place at the first wings 52.1 and 58.1 of the first and fourth angle brackets 52 and 58, parallel to the vertical median plane PMV. The third fixings 66.3 traverse the first longitudinal member 44, the first wing 52.1 of the first angle bracket 52 integral with the first lateral panel 48 and at least partially the transverse frames 42. The fourth fixings 66.4 traverse the first longitudinal member 44, the first wing 58.1 of the fourth angle bracket 58 integral with the second lateral panel 50 and at least partially the transverse frames 42.

Irrespective of the embodiment, the first and second lateral panels 48 and 50 each comprise a angle bracket such as to obtain an L form 60.

According to the first embodiment, the first and second lateral panels 48 and 50 are arranged head-to-tail. In this case, the first and second longitudinal members 44, 46 each comprise a angle bracket such as to obtain an L form 60. This first embodiment makes it possible to dispense with all the shims.

According to a second embodiment, the first and second longitudinal members 44, 46 are symmetrical relative to the vertical median plane PMV. In this case, one of the first and second longitudinal members 44, 46 comprises two angle brackets such as to obtain a U form, and the other of the first and second longitudinal members 44, 46 does not comprise a angle bracket. This second embodiment makes it possible to dispense with fifty percent of the shims.

Irrespective of the embodiment, the invention makes it possible to reduce the time for assembly of the primary structure owing to the fact that at least 50% of the shims are dispensed with.

Furthermore, the various components may be manufactured with smaller dimensional tolerances, which tends to reduce manufacturing costs.

As in the case of the prior art, the transverse frames 42, the longitudinal members 44, 46, the lateral panels 48, 50 and the angle brackets 52 to 58 are fixed temporarily at a small number of points and are then drilled and final fixings are put in place.

According to another assembly technique, given that at least certain components amongst the first and second longitudinal members and the first and second lateral panels may slide relative to one another, it is possible to use an assembly technique that makes provision for forming the holes that are necessary for accommodating the fixings 66.1 to 66.4 during manufacture of the components and not during assembly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a primary structure of an aircraft pylon,
   the aircraft pylon comprising:
   transverse frames each with an approximately square or rectangular contour comprising four sides,
   first and second longitudinal members positioned above and below the transverse frames,
   first and second lateral panels arranged on either side of the transverse frames,
   four angle brackets connecting each of the longitudinal members to each of the lateral panels,
   accommodated in recesses provided on the transverse frames,
   wherein the assembly method comprises a step of fixing an angle bracket on each of the first and second lateral panels such as to obtain an L form for each of the first and second lateral panels prior to a placement of said L forms each placed against two sides of each of the transverse frames.

2. The method for assembling a primary structure of an aircraft pylon according to claim 1,
   wherein the assembly method comprises a step of fixing an angle bracket on each of the first and second longitudinal members such as to obtain said L form for each of the first and second longitudinal members prior to a placement of said L forms each placed against the two sides of each of the transverse frames.

3. The method for assembling a primary structure of an aircraft pylon according to claim 2, wherein a first wing of a first angle bracket is connected to a first longitudinal edge of the first longitudinal member, a second wing of a second angle bracket is connected to a first longitudinal edge of the first lateral panel, a first wing of a third angle bracket is connected to a first longitudinal edge of the second longitudinal member and a second wing of a fourth angle bracket is connected to a first longitudinal edge of the second lateral panel.

4. The method for assembling a primary structure of an aircraft pylon according to claim 3, further comprising:
   positioning the first longitudinal member placed against a first side of the transverse frames and of a second wing of the first angle bracket placed against a second side of the transverse frames;
   positioning of the first lateral panel placed against the second side of the transverse frames and of a first wing of the second angle bracket placed against a third side of the transverse frames, said first lateral panel covering the second wing of the first angle bracket;
   positioning of the second longitudinal member placed against the third side of the transverse frames and of a second wing of the third angle bracket placed against a fourth side of the transverse frames, said second longitudinal member covering the first wing of the second angle bracket; and
   positioning of the second lateral panel placed against the fourth side of the transverse frames and of a first wing of the fourth angle bracket placed against the first side of the transverse frames, by inserting the first wing of the fourth angle bracket between the first side of the transverse frames and the first longitudinal member, the second lateral panel covering the second wing of the third angle bracket.

5. The method for assembling a primary structure of an aircraft pylon according to claim 1, wherein the assembly method comprises a step of fixing two angle brackets to one of the first and second longitudinal members such as to obtain a U form prior to a placement of the first and second longitudinal members placed against the sides of each transverse frame.

6. The method for assembling a primary structure of an aircraft pylon according to claim 5, further comprising:
   positioning of the longitudinal member, provided with the two angle brackets, placed against one of the sides of the transverse frames, wings of the two angle brackets being arranged on either side of the transverse frames,
   positioning of the first and second lateral panels placed against two opposite sides of the transverse frames, and
   positioning of the longitudinal member that is not provided with an angle bracket placed against one of the sides of the transverse frames.

7. The method for assembling a primary structure of an aircraft pylon according to claim 6, further comprising a step of placement of:
   first fixings, perpendicular to a vertical median plane, traversing one of the first and second lateral panels, a wing of one of the two angle brackets integral with the first or second longitudinal member and at least partially the transverse frames;
   second fixings, perpendicular to the vertical median plane, traversing the other of the first and second lateral panels, a wing of the other angle bracket integral with the first or second longitudinal member and at least partially the transverse frames;
   third fixings, parallel to the vertical median plane, traversing the longitudinal member that is not provided with an angle bracket, a wing of an angle bracket integral with one of the first and second lateral panels and at least partially the transverse frames; and
   fourth fixings, parallel to the vertical median plane, traversing the longitudinal member that is not provided with an angle bracket, a wing of a angle bracket integral with the other of the first and second lateral panels and at least partially the transverse frames.

* * * * *